United States Patent
Bouaziz et al.

(10) Patent No.: US 10,942,630 B2
(45) Date of Patent: Mar. 9, 2021

(54) MOTOR VEHICLE OPERATOR CONTROL APPARATUS HAVING MULTIPLE COUPLED SCREENS

(71) Applicant: AUDI AG, Ingolstadt (DE)

(72) Inventors: Tahar Bouaziz, Ingolstadt (DE); Simone Paula, Rain (DE)

(73) Assignee: AUDI AG, Ingolstadt (DE)

( * ) Notice: Subject to any disclaimer, the term of this patent is extended or adjusted under 35 U.S.C. 154(b) by 278 days.

(21) Appl. No.: 15/757,904

(22) PCT Filed: Aug. 3, 2016

(86) PCT No.: PCT/EP2016/068488
§ 371 (c)(1),
(2) Date: Mar. 6, 2018

(87) PCT Pub. No.: WO2017/041962
PCT Pub. Date: Mar. 16, 2017

(65) Prior Publication Data
US 2020/0125242 A1    Apr. 23, 2020

(30) Foreign Application Priority Data
Sep. 11, 2015   (DE) ..................... 10 2015 011 647.9

(51) Int. Cl.
*G06F 3/048*   (2013.01)
*G06F 3/0484*   (2013.01)
(Continued)

(52) U.S. Cl.
CPC .......... *G06F 3/04845* (2013.01); *B60K 35/00* (2013.01); *B60K 37/02* (2013.01);
(Continued)

(58) Field of Classification Search
CPC .. G06F 3/04845; G06F 3/0488; G06F 3/0486; B60K 37/02; B60K 37/06;
(Continued)

(56) References Cited

U.S. PATENT DOCUMENTS 6,545,669 B1 * 4/2003 Kinawi ................. G06F 3/0486
345/1.1
2007/0157089 A1 * 7/2007 Van Os ............... G06F 3/04886
715/702

(Continued)

FOREIGN PATENT DOCUMENTS

| CN | 104199552 A | 12/2014 |
| DE | 102015011647.9 | 9/2015 |

(Continued)

OTHER PUBLICATIONS

International Search Report for PCT/EP2016/068488 dated Oct. 14, 2016.

(Continued)

*Primary Examiner* — Carolyn R Edwards
(74) *Attorney, Agent, or Firm* — Staas & Halsey LLP

(57) ABSTRACT

First and second touch-sensitive screens are included in an operator control apparatus for a motor vehicle with the second screen arranged at a distance from the first screen. A control device generates a first graphical element on the first screen and a second graphical element on the second screen with at least the first graphical element able to be depicted on both screens. The control device can receive a predetermined change command from at least one of the first and second screens and thereafter a predetermined drag command from a user and to take the change command as a basis for depicting the first graphical element on the second screen and to take the drag command for the depiction on the second screen as a basis for adjusting a relative orientation (Continued)

of the first graphical element and the second graphical element in relation to one another.

16 Claims, 2 Drawing Sheets

(51) Int. Cl.
    *B60K 35/00*     (2006.01)
    *B60K 37/02*     (2006.01)
    *B60K 37/06*     (2006.01)
    *G06F 3/0486*    (2013.01)
    *G06F 3/0488*    (2013.01)
(52) U.S. Cl.
    CPC ............ *B60K 37/06* (2013.01); *G06F 3/0486* (2013.01); *G06F 3/0488* (2013.01); *B60K 2370/115* (2019.05); *B60K 2370/1468* (2019.05); *B60K 2370/164* (2019.05)
(58) Field of Classification Search
    CPC .............. B60K 35/00; B60K 2370/164; B60K 2370/115; B60K 2370/1468
    See application file for complete search history.

(56)            References Cited

U.S. PATENT DOCUMENTS

2010/0127847 A1*  5/2010  Evans ................. G06F 3/04886
                                                         340/461
2013/0245882 A1   9/2013  Ricci 2016/0004418 A1*  1/2016  Lee ........................ B60K 35/00
                                                         715/765
2017/0154608 A1*  6/2017  Hamaguchi .............. G09G 5/14

FOREIGN PATENT DOCUMENTS

DE       102015011647 B2   1/2017
EP          2 169 524 A2   3/2010
EP          2 775 387 A2   9/2014
WO   PCT/EP2016/068488     8/2016

OTHER PUBLICATIONS

Office Action for German Patent Application 10 2015 011 647.9 dated Jul. 22, 2016.
Braun, Peter; "Sorry Automakers, 2 Screens Are Definitely Not Better Than 1", dated Aug. 14, 2014 on digitaltrends.com/cars/screen-two-far-acura-Infiniti-start-worrying-trend-infotainment//, saved by Internet Archive Wayback Machine on May 12, 2015 at web.archive.org/web/201505012075957, retrieved Oct. 5, 2016.
European Office Action for EP Application No. 16751242.5 dated Mar. 7, 2019.
English Translation by WIPO of the International Preliminary Report on Patentability dated Mar. 15, 2018, in corresponding International Patent Application No. PCT/EP2016/068488, 10 pp.
Chinese Office Action dated Jul. 3, 2020 from Chinese Patent Application No. 201680052597.1, 12 pp.

* cited by examiner

MOTOR VEHICLE OPERATOR CONTROL APPARATUS HAVING MULTIPLE COUPLED SCREENS

CROSS REFERENCE TO RELATED APPLICATIONS

This application is the U.S. national stage of International Application No. PCT/EP2016/068488, filed Aug. 3, 2016 and claims the benefit thereof. The International Application claims the benefit of German Application No. 10 2015 011 647.9 filed on Sep. 11, 2015, both applications are incorporated by reference herein in their entirety.

BACKGROUND

Described below is an operator control apparatus for a motor vehicle. The operator control apparatus has two touch-sensitive screen units and a control device for depicting graphical elements on the screen units. Also described below are a motor vehicle having the operator control apparatus and a method for operating the operator control apparatus.

A motor vehicle may have provision for more than one touch-sensitive screen unit (touchscreen) to be provided. On each screen unit, the control device can depict at least one respective graphical element, that is to say an icon or a control surface (button, slider, rotary control), for example. In this case, the user should then have the option of autonomously stipulating which graphical element he wishes to have depicted on which screen unit and where on the selected screen unit the graphical element is supposed to be displayed.

SUMMARY

An operator control apparatus having multiple screen units that allows a user-controlled arrangement of a graphical element on one of the screen units is described below.

an operator control apparatus for a motor vehicle has at least two touch-sensitive screen units, that is to say a touch-sensitive first screen unit and a touch-sensitive second screen unit that is arranged at a distance from the first screen unit. As a result of the distanced arrangement, there is thus a distance of greater than 0, for example a gap or space, between the two screen units. The operator control apparatus moreover has a control device for depicting a first graphical element on the first screen unit and a second graphical element on the second screen unit. In this case, depicting a graphical element means that the control device provides appropriate graphical data that are then displayed or output by the respective screen unit. The two graphical elements may each be an icon or a control surface or a menu entry for triggering an appliance function, in the manner described, for example.

If the user now wishes to depict the first graphical element on the second screen unit together with the second graphical element, he needs to transfer the first graphical element to the second screen unit and define the relative orientation of the first graphical element in relation to the second graphical element. On a single screen unit, this is possible simply by what is known as "dragging". Since the two screen units are now at a distance from one another, however, it is necessary to render the user capable of dragging the first graphical element across the distance to the second screen unit. To this end, the control unit may be set up to receive a predetermined change command and thereafter a predetermined drag command from a user and to take the change command as a basis for depicting the first graphical element on the second screen unit and to take the drag command as a basis for adjusting a relative orientation of the first graphical element and the second graphical element in relation to one another for the depiction on the second screen unit. Using the change command, the user defines which graphical element on the first screen unit is supposed to be transferred as the first graphical element to the second screen unit. Using the drag command, the user defines the relative orientation between the first graphical element and the second graphical element for the depiction on the second screen unit. The control device can receive the change command and/or the drag command via the first and/or the second screen unit. Since both screen units are touch-sensitive, this can be effected in a manner known per se by virtue of an appropriate touch of the touch-sensitive display area of the screen unit. To produce the touch sensitivity, the display area may be configured to have a capacitive sensor matrix, for example.

The arrangement provides an advantage that the user can use the change command and the drag command to transfer the first graphical element from the first screen unit to the second screen unit and can use the drag command to adjust or define a relative orientation of the first graphical element in relation to the second graphical element. It is therefore possible for the user to define the display location of the first graphical element in the motor vehicle according to his needs to the effect that he can both trigger a change of the display location from the first screen unit to the second screen unit and define or adjust the relative orientation of the first graphical element in relation to the second graphical element for the depiction on the second screen unit. In one example, the execution of the change command deletes the first graphical element from the first screen unit.

According to one development, the control device is set up to receive the drag command via the first screen unit. In other words, the user drags or moves the first graphical element by a drag command that he inputs on the first screen unit. By way of example, it is thus possible for the user to perform drag inputs on the first screen unit to define the relative orientation, in which case the first graphical element already depicted on the second screen unit then moves on the second screen unit according to the drag inputs. This results in the advantage that the user does not need to take away his hand from the first screen unit after selection of the first graphical element for the change command, but rather can also execute the drag command on the first screen unit. As a result, it is not necessary for the user to change his hand from the first screen unit to the second screen unit.

According to one development, the control device is set up so as, on receiving the change command defining the first graphical element for the change, to first of all also depict the second graphical element on the first screen unit and then receive the drag command. In other words, after selection of the first graphical element, that is to say after input of the change command, the change command is not executed immediately, but rather the second graphical element is first of all likewise depicted on the first screen unit, so that the user can execute the drag command on the first screen unit and, in so doing, has the relative orientation of the first graphical element in relation to the second graphical element depicted on the first screen unit directly. This results in the advantage that the relative orientation can be defined correctly via the first screen unit. The second graphical element can be depicted opaquely or semi-transparently, for example, on the first screen unit. A semitransparent depiction results in the advantage that, during the execution or input of the drag command, no concealment is effected by the second graphical element on the first screen unit.

One development provides for the control device to be set up so as, when the second graphical element is depicted on the first screen unit, to execute the already received change command only after receiving a confirmation signal. Thus, while the second graphical element is depicted on the first screen unit, the user can input the drag command, that is to say define the relative orientation between the graphical elements, until the confirmation signal depicts the first graphical element and hence also the second graphical element on the second screen unit, that is to say that the actual change of the first graphical element from the first screen unit to the second screen unit is performed.

In regard to the confirmation signal, one development provides for the confirmation signal to signal removal of a control element of the user from the first screen unit. The control element may be a finger of the user, for example. In other words, the change command is executed when the user takes away or removes his finger from the first screen unit. Thus, after the user has dragged the first graphical element to the desired relative orientation in relation to the second graphical element and takes away the control element, for example his finger, from the screen unit, the drag command is deemed at an end or completely input. Thereafter, the change command is then executed finally.

Alternatively, there may be provision for the confirmation signal to signal operation of a predetermined control panel depicted on the first or the second screen unit. By way of example, a confirmation button or confirmation icon may thus be provided. This results in the advantage that the user can move his hand on the first screen unit or can perform repeated dragging movements for the first graphical element without this resulting in the drag command being prematurely or undesirably identified as at an end and the change command being executed.

According to one development, the control device is set up to provide a container element for presenting or collecting program favorites as the second graphical element. By way of example, the second graphical element may thus be a favorites bar or a frame within which other graphical elements, that is to say in particular icons or buttons, can be arranged. This results in the advantage that the user can collect or arrange graphical elements from the first screen unit, that is to say in particular the first graphical element, within the container element on the second screen unit in order thereby to have the respective graphical elements that are arranged in a container element by a change command or a drag command directly accessible on the second screen unit.

In order to generate a change command on the touch-sensitive first screen unit, one development provides for the control device to be set up to identify a touch of the first graphical element as the change command, a contact time for the touch being greater than a predetermined minimum value. In other words, the user needs to touch the graphical element on the first screen unit with the control element described, that is to say his finger, for example, and maintain this touch for a contact time that is longer or greater than the minimum value. The control device then identifies that this is the change command for transferring or changing the first graphical element to the second screen unit. It is then possible, in the manner described, for the second graphical element likewise to be depicted on the first screen unit, for example, so that the user can define the relative orientation of the two graphical elements. There may be provision for the change command to have the user additionally needing to drag the first graphical element to an edge of the first screen unit. This allows a distinction to be drawn between a dragging within the first screen unit and the change command.

One development provides for the control device to be set up to identify a drag-and-drop movement as the drag command. This results in the advantage that the user defines the dragging of the first graphical element in relation to the second graphical element on a one-to-one basis by moving his hand. There is thus no need for conversion of the movement, as would be necessary if a joystick or a slider were used, for example.

As already explained, the motor vehicle has an embodiment of the operator control apparatus described above. In this case, the operator control apparatus is coupled to at least one vehicle appliance. The at least one vehicle appliance may be an infotainment system and/or an air-conditioning device of the motor vehicle, for example. The operator control apparatus is designed so as, when a first graphical element is touched, to activate a predetermined appliance function, assigned to the first graphical element, in the at least one vehicle appliance. In other words, the first graphical element is thus an icon or a button or a menu entry in order to select or trigger or activate an assigned appliance function. In the case of the motor vehicle, the user can transfer or change this first graphical element from the first screen unit to the second screen unit, so that he has the first graphical element available on the second screen unit.

Finally, in a method for operating an operator control apparatus of a motor vehicle, a control device depicts a first graphical element on a touch-sensitive first screen unit and a second graphical element on a touch-sensitive second screen unit that is arranged at a distance from the first screen unit. In order to transfer the first graphical element from the first screen unit to the second screen unit in the manner described, the control device uses the first and/or the second screen unit to receive a predetermined change command and thereafter a predetermined drag command from a user. The change command is taken as a basis for depicting the first graphical element on the second screen unit, and the drag command is taken as a basis for adjusting a relative orientation of the first graphical element and the second graphical element in relation to one another for the depiction on the second screen unit. As already explained, the change command and the drag command may be nested in one another to the effect that first of all the change command is received and, before execution of the change command, first of all the drag command is received and the relative orientation is defined on the first screen unit, for example, before the actual change command is then finally executed.

The motor vehicle may be a motorcar, in particular an automobile.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
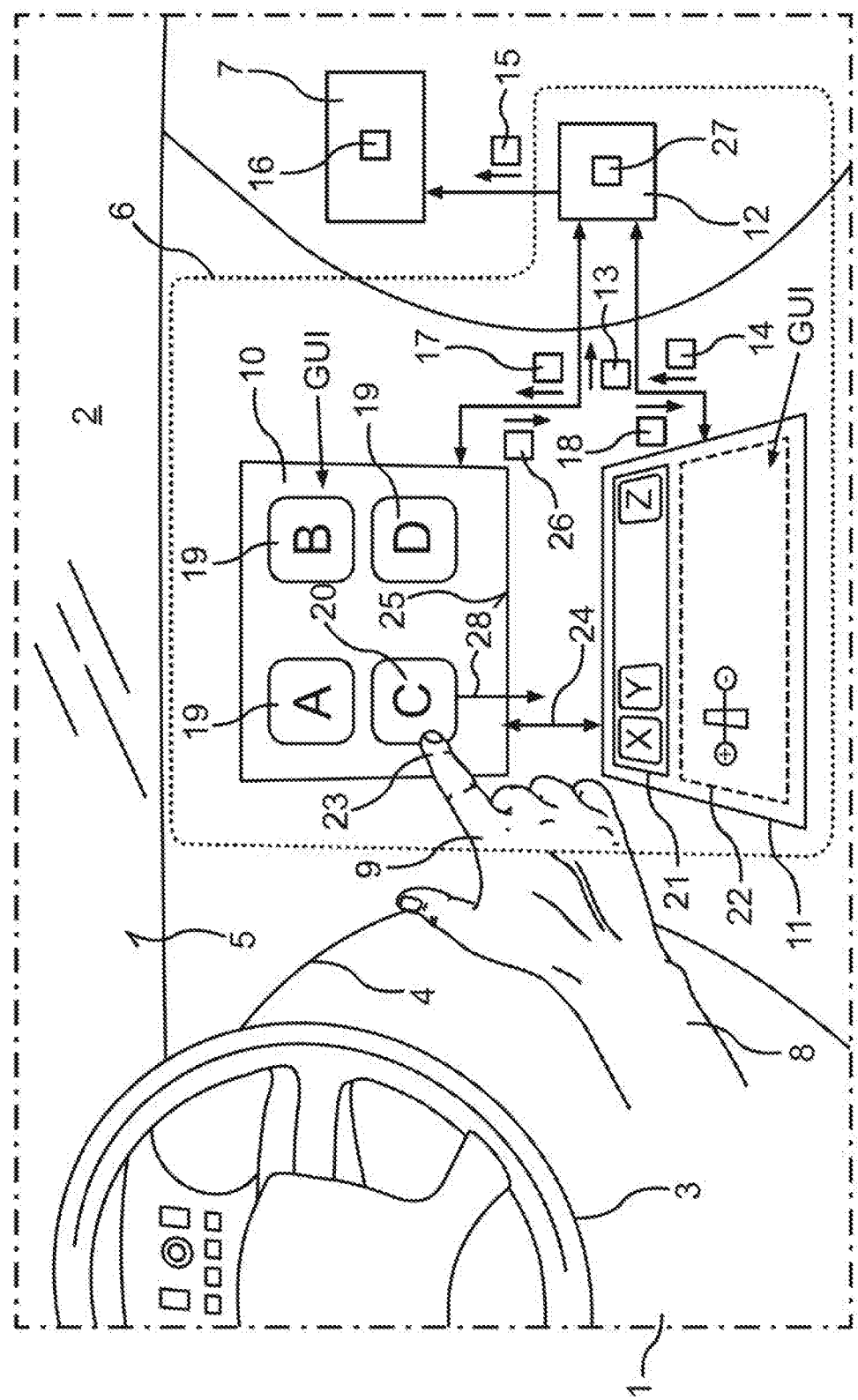
FIG. 1 is a schematic block and perspective view of an embodiment of the motor vehicle interior.

In the exemplary embodiment described below, the components of the embodiment that are described are each individual features that should be considered independently of one another, or in a combination other than that shown. Moreover, the embodiment described can also be augmented by further instances of the features that have already been described.

In the drawings, elements having the same function are each provided with the same reference symbols.

FIG. 1 illustrates the interior of a motor vehicle 1, which may be a motorcar, in particular an automobile, for example. A vehicle interior 2 with a steering wheel 3, a center console 4 and a windshield 5 is depicted. The motor vehicle 1 has an operator control apparatus 6 by which at least one vehicle appliance 7 can be controlled by a user 8. Only a hand 9 of the user 8 is depicted in FIG. 1. The at least one vehicle appliance 7 may be an information entertainment system (infotainment system) and/or an air-conditioning device, for example.

The operator control apparatus 6 has at least two screen units, i.e., displays, namely a first screen unit 10 and a second screen unit 11. Both the first and second displays, or screen units 10, 11 have touch-sensitive screens, that is to say that they have touchscreens. The screen units 10, 11 are coupled to a control device 12. The control device 12 may be realized on the basis of a microcontroller or a microprocessor, for example. The control device 12 can take touch signals 13, 14 from the touch-sensitive screen units 10, 11 as a basis for generating a respective control signal 15 for the at least one vehicle appliance 7. The control signal 15 then activates a respective appliance function 16 in the at least one vehicle appliance 7.

The control device 12 moreover realizes a graphical user interface GUI on the two screen units 10, 11, which graphical user interface displays the selectable or triggerable appliance functions 16 to the user 8. The graphical user interface GUI is generated or adjusted or depicted on the respective screen unit 10, 11 by the control device 12 transmitting and receiving graphical data 17, 18. Respective graphical elements 19, 20, 21, 22 of the GUI are shown. By way of example, it may be assumed that the graphical elements 19, 20 on the screen unit 10 are control elements for triggering an appliance function 16. The graphical element 21 may be a container element, for example, that can act for the purpose of collected and spatially ordered depiction of multiple control elements such as the graphical elements 19, 20. The graphical element 21 is therefore what is known as a shortcut bar or an abbreviation bar or a corresponding shortcut menu, for example. The graphical element 22 may be provided for the purpose of controlling or operating a part of the at least one vehicle appliance 7. By way of example, it may be a user interface for an air-conditioning device. The graphical element 22 is not relevant to the further explanation of the exemplary embodiment.

In the example illustrated in FIG. 1, the user 8 wishes to drag the graphical element 20 from the first screen unit 10 to the second screen unit 11 and arrange it in the container element, that is to say the second graphical element 21. The user 8 is then able, independently of a current display content of the screen unit 10, to select or activate in the container element the appliance function 16 assigned to the graphical element 20 directly using the second screen unit 11.

A problem in this case is that the user 8 cannot simply use the known drag-and-drop method to pull the graphical element 20 from the first screen unit 10 to the second screen unit 11 with a finger 23 of the hand 9. The reason is that the screen units 10, 11 are at a distance 24 from one another that is sensorless, that is to say that is not part of the touch-sensitive surfaces of the screen units 10, 11.

The user 8 can thus admittedly use his finger 23 to move the graphical element 20 to a lower screen edge 25 using the drag-and-drop method known per se. At that point, however, he would need to remove his finger 23 from the screen unit 10 and reach across to the screen unit 11. This firstly requires deliberate alignment of the hand 9 in relation to the screen unit 11. This distracts the driver from the road traffic. Secondly, it must be clear to the control apparatus 12 that the user 8 wishes to continue the process of dragging to the screen unit 11. This is difficult to realize in terms of software. In the case of the motor vehicle 1, there is a solution to this that renders the user 8 capable of arranging the graphical element 20 in the container element of the graphical element 21 without this requiring him to move his hand from the screen unit 10 to the screen unit 11.

To this end, the user 8 first of all generates a change command 26, for example by touching his finger 23 to the graphical element 20 for longer than a predetermined minimum period 27. The minimum period 27 can be monitored by the control device 12, for example. Thereafter, the graphical element 20 is draggable with the finger 23 on the screen unit 10. The user 8 performs a first dragging movement 28 to the lower screen edge 25.

Figure 2:
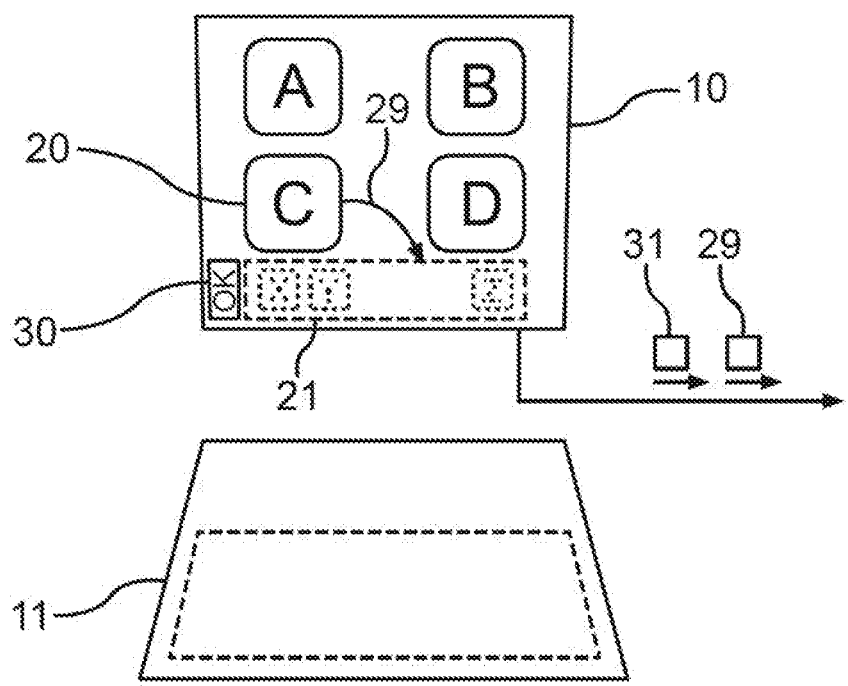
FIG. 2 is block diagram of an operator control apparatus of the motor vehicle during input of a drag command.

FIG. 2 illustrates the subsequently produced reaction of the control device 12. The control device 12 depicts the graphical element 21, that is to say the container element, on the first screen unit 10. The depiction can be effected in the same manner as on the screen unit 11. In FIG. 2, however, an alternative is depicted that involves the graphical element 21 being depicted semi-transparently on the screen unit 10. It is moreover likewise possible for the container element to remain depicted on the screen unit 11. However, FIG. 2 shows an alternative that involves the second graphical element 21 being depicted only once, namely on the screen unit 10. The user can now generate a drag command 29 to define the position of the graphical element 20 in relation to the graphical element 21, that is to say the position of the graphical element 20 within the container element. This drag command may again be a swipe movement or pulling movement of the finger 23 on the touch-sensitive screen unit 10, for example. The user 8 thereby defines the position of the graphical element 20 within the container element, that is to say the relative orientation of the graphical element 20 in relation to the graphical element 21.

Thereafter, the user needs to signal that he has finished arranging the graphical element 20 in relation to the graphical element 21 and the graphical element 21 can be depicted with the graphical element 20 on the screen unit 11. To this end, in the simplest case, there may be provision for the user 8 to remove his finger 23 from the screen unit 10. In other words, he finishes touching the screen unit 10. Alternatively, a control element 30 may be provided that, when operated, generates an appropriate predetermined confirmation signal. The control element 30 may be a control surface or a button, for example.

Figure 3:
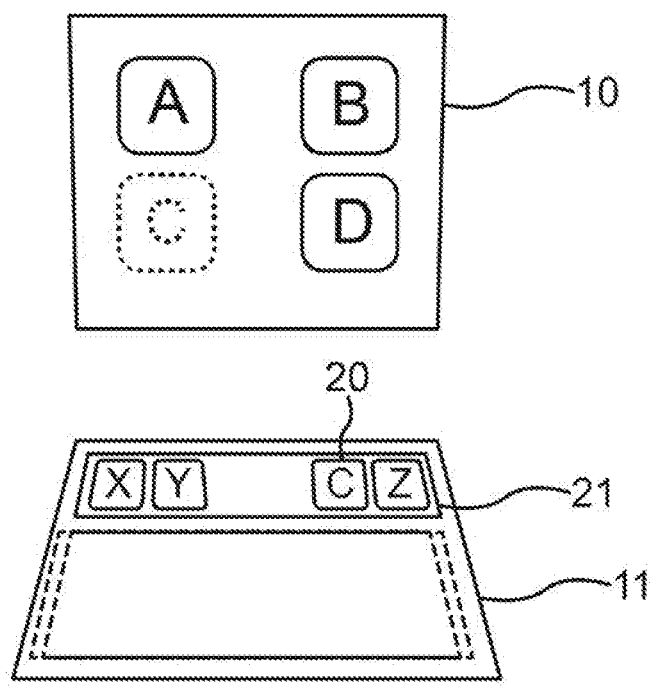
FIG. 3 is block diagram of the operator control apparatus after execution of a change command.

FIG. 3 shows how the control device 12, after receiving the confirmation signal 31, depicts the graphical elements 20, 21 together on the screen unit 11. The relative orientation of the graphical element 20 in relation to the graphical element 21 has been defined by the user on the screen unit 10 by the drag command 29. The relative orientation is now also set for the screen unit 11, without the user 8 having had to move his hand 9 between the screen unit 10 and the screen unit 11.

The user 8 now has the graphical element 20 permanently available within the container element for selection of an appliance function 16 assigned to the graphical element 20, even if the screen content of the screen unit 10 is changed, for example because the user changes the control menu.

The operator control apparatus 6 thus allows functions that are each represented by a graphical element to be pulled from the upper screen unit 10 to the lower edge 25 of the upper screen unit 10 so as then also to be available on the lower screen unit 11. Such functions are favorites that are used frequently, for example for air-conditioning operation.

In particular, it is possible for a first graphical element 20 that is supposed to be selected as a favorite to be selected in the upper screen unit 10, for example by keeping the finger 23 on the graphical element 20 for a prolonged time. The container element, that is to say the favorites bar, is then dragged from the lower screen unit 11 up to the lower edge 25 of the upper screen unit 10. This dragging is only momentary or temporary while the user 8 arranges the graphical element 20 in the container element. In this case, the graphical element 20 can be pushed in by drag and drop, for example.

Thereafter, the container element is then displayed on the lower screen unit 11 again together with the graphical element 20 that has been pushed in.

This results in simplified operability. In particular, the control device 12 thereby allows communication or exchange of graphical elements between the two touchscreens or screen units 10, 11.

Overall, the example shows how, in the case of a two-touchscreen concept, functions (favorites) can be dragged from one display over the edge to another display.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. An operator control apparatus coupled to at least one vehicle appliance in a motor vehicle, comprising:
   first and second displays, each having a touch-sensitive screen, the second display separated at a predefined distance from the first display by a sensorless surface, and
   a control device configured to
      depict a first graphical element on the first display and a second graphical element, as a container element of program favorites, on the second display,
      activate, when the first graphical element is touched, a predetermined appliance function, assigned to the first graphical element, in the at least one vehicle appliance,
      receive, from the touch-sensitive screen of at least one of the first and second displays, a predetermined change command and thereafter a predetermined drag command of a user,
      take the change command as a basis for depicting the first graphical element on the second display,
      take the drag command as a basis for placing the first graphical element into the container element of the program favorites in the second graphical element, and
      depict all of the first graphical element within the container element on the second display even after screen content of the first display is changed.

2. The operator control apparatus as claimed in claim 1, wherein the control device is configured to receive the drag command from the touch-sensitive screen of the first display.

3. The operator control apparatus as claimed in claim 2, wherein the control device is configured, upon receiving the change command, to first depict the second graphical element on the first display and then receive the drag command.

4. The operator control apparatus as claimed in claim 3, wherein the control device is configured, when the second graphical element is depicted on the first display, to execute the change command, previously received, only after receiving a confirmation signal.

5. The operator control apparatus as claimed in claim 4, wherein the confirmation signal indicates one of removal of a control element of the user from the first display and operation of a predetermined control panel depicted on one of the first and second displays.

6. The operator control apparatus as claimed in claim 1, wherein the control device is configured to identify a touch of the first graphical element as the change command when a contact time for the touch is greater than a predetermined minimum value.

7. The operator control apparatus as claimed in claim 1, wherein the control device is configured to identify a drag-and-drop movement as the drag command.

8. A motor vehicle, comprising:
   at least one vehicle appliance, and
   an operator control apparatus, coupled to the at least one vehicle appliance, including
      first and second displays, each having a touch-sensitive screen, the second display separated at a predefined distance from the first display by a sensorless surface, and
      a control device configured to
         depict a first graphical element on the first display and a container element of program favorites as a second graphical element on the second display,
         activate, when the first graphical element is touched, a predetermined appliance function, assigned to the first graphical element, in the at least one vehicle appliance,
         receive, from the touch-sensitive screen of at least one of the first and second displays, a predetermined change command and thereafter a predetermined drag command of a user,
         take the change command as a basis for depicting the first graphical element on the second display,
         take the drag command as a basis for placing the first graphical element into the container element, and
         depict all of the first graphical element within the container element on the second display even after screen content of the first display is changed.

9. The motor vehicle as claimed in claim 8, wherein the control device is configured to depict the container element on the first display upon receiving the change command from the touch-sensitive screen of the first display, prior to receiving the drag command.

10. The motor vehicle as claimed in claim 9, wherein the control device is configured, when the container element is depicted on the first display, to execute the change command, previously received, only after receiving a confirmation signal.

11. The motor vehicle as claimed in claim 10, wherein the confirmation signal indicates one of removal of a control element of the user from the first display and operation of a predetermined control panel depicted on one of the first and second displays.

12. A method for operating an operator control apparatus of a motor vehicle, comprising:
  depicting, by a control device, a first graphical element on a first display and a second graphical element, as a container element of program favorites, on a second display, the first and second displays each having a touch-sensitive screen, the second display separated at a predefined distance from the first display;
  activating, by the control device when the first graphical element is touched, a predetermined appliance function, assigned to the first graphical element, in at least one vehicle appliance coupled to the operator control apparatus;
  receiving, by the control device from the touch-sensitive screen of at least one of the first and second displays, a predetermined change command and thereafter a predetermined drag command input by a user;
  taking the change command as a basis for depicting the first graphical element on the second display;
  taking the drag command for depiction on the second display as a basis for placing the first graphical element into the container element of the program favorites in the second graphical element; and
  displaying all of the first graphical element depicted within the container element on the second display even if the screen content of the first display is changed.

13. The method as claimed in claim 12, further comprising depicting, by the control device, the container element on the first display upon receiving the change command from the touch-sensitive screen of the first display, prior to receiving the drag command.

14. The method as claimed in claim 13, further comprising executing, by the control device, when the container element is depicted on the first display, the change command, previously received, only after receiving a confirmation signal.

15. The method as claimed in claim 14, wherein the confirmation signal indicates one of removal of a control element of the user from the first display and operation of a predetermined control panel depicted on one of the first and second displays.

16. The method as claimed in claim 12, wherein the second display is separated from the first display by a sensorless surface across the predefined distance.

* * * * *